UNITED STATES PATENT OFFICE.

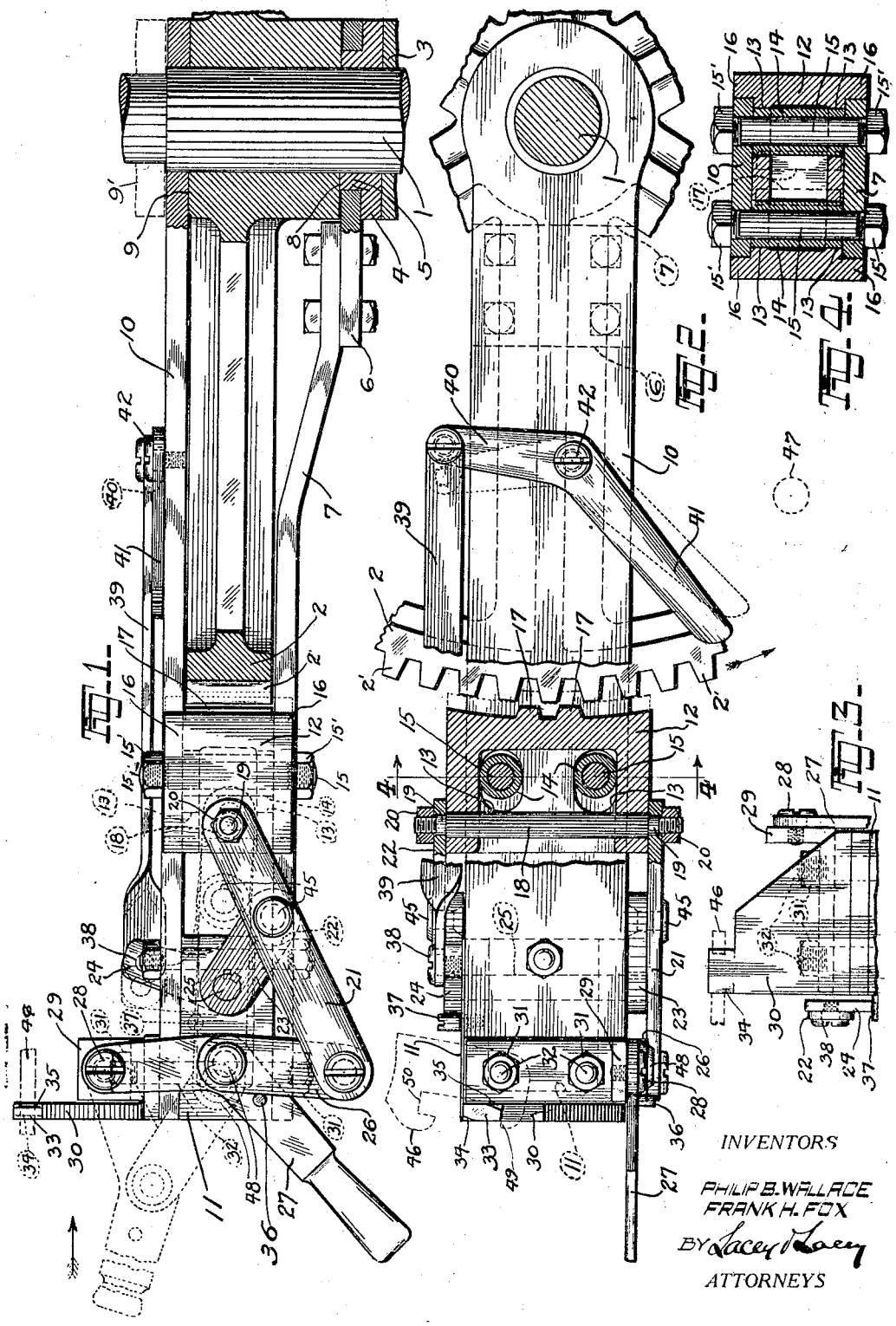

PHILIP B. WALLACE, OF BURLINGAME, AND FRANK H. FOX, OF SAN FRANCISCO, CALIFORNIA.

GEAR-CLUTCH FOR BENDING-MACHINES.

1,342,363.   Specification of Letters Patent.   Patented June 1, 1920.

Application filed February 5, 1919. Serial No. 275,168.

*To all whom it may concern:*

Be it known that we, PHILIP B. WALLACE and FRANK H. FOX, citizens of the United States, residing, respectively, at Burlingame, in the county of San Mateo, and in the city and county of San Francisco and State of California, have invented certain new and useful Improvements in Gear-Clutches for Bending-Machines, of which the following is a specification.

This invention has for its main object to provide an interlocking arrangement whereby a rotatable gear and a member co-acting therewith may be coupled for rotation about a common center, the invention being designed more particularly for use upon bending machines of the type disclosed in Letters-Patent No. 1,206,742 and No. 1,206,743, granted November 28, 1916, and No. 1,263,301, granted April 16, 1918, to John S. Wheeler.

One object of the invention is to provide simple means whereby a moving part may be firmly held to the means for driving it and quickly released when the desired work is done.

With these objects in view, the invention comprises various features of construction and arrangement of parts as hereinafter set forth, and illustrated in the annexed drawings, in which—

Figure 1 is a side elevation of the complete device showing the gear clutch in its neutral position, the dotted position indicating the clutch in engagement with the gear;

Fig. 2 is a plan view, partly broken away and partly in section;

Fig. 3 is an end view in the direction of the arrow, Fig. 1;

Fig. 4 is a cross section of the gear clutch on line 4—4, Fig. 2.

Numeral 1 indicates a standard or post upon which is rotatable a gear 2, having teeth 2', which is driven by another gear, not shown for convenience, deriving its power from any suitable source. Upon a bearing 3 is mounted a ring or flange 4 having a spindle portion 5 around which fits a strap 6 connected to a bar 7, the end of the spindle portion providing a seat for the hub face 8 of the gear 2. Upon the upper face 9 of said gear and around the standard is mounted another bar 10, held in place on the shaft by any convenient device 9', indicated in the dotted form. A bearing block 11 is secured to and between the outer ends of the bars 7 and 10 so that by removing the holding device 9' and disconnecting the bar 7 from the strap 6, the entire device may be removed from the supporting post, leaving the driving gear 2 in place, which gear is generally of large diameter and weighs several hundred pounds. A clutch member or crosshead 12 is slidable between the bars 7 and 10 in the plane of the gear 2 as shown in Fig. 1. The clutch member or crosshead 12 is provided with slots 13 receiving spacers 14 secured by studs 15, provided with lock nuts 15', between the bars 7 and 10. The side walls of the clutch member have lips 16, and the connecting end wall has stub teeth or lugs 17, of which there may be as many as desired, shaped to engage closely the teeth 2' of the gear 2. It is to be noted that the teeth 17 are short so as to allow for instant disengagement from the teeth of the gear 2 when rotating. Extending through the side walls of the clutch member is a rod 18, having smooth reduced portions 19 at each end for securing thereon, by lock nuts 20, a lever 21 and a link 22, which connect, respectively, to a link 23 and a bell crank 24 both secured to a rod 25. The lever 21 connects further to another link 26 which is pivoted to a shift lever 27 fulcrumed at 28 to a bearing 29 fastened, for example, upon an angle plate 30 and the bar 10 by lock nuts 31 and studs 32, extending through the bars 7 and 10 and the bearing block 11. The angle plate 30 has a projecting lug 33 beveled at 34 and 35. Stop pins 36 and 37 are provided on the shift lever 27 and bearing block 11, respectively. Pivoted to the bell crank 24 at 38 is a bar 39 connecting to an arm 40 of a switch or kick-off lever 41, fulcrumed at 42 upon the bar 10.

The operation is as follows: In Figs. 1 and 2 the clutch is shown in the open or neutral position. To move it into engagement with the gear 2, the lever 27 is shifted to the dotted position, indicated in Fig. 1, in which the links 22 and 23 are locked over the center at the pivot points 45 with the lever 21 and bell crank 24, the stop 37 determining the locking position. With the teeth 17 and 2' engaged, the bar 10, with all the parts mounted thereon, is rotated with the gear 2 about the post 1, and a draw-bar 46, shown in dotted lines engaged over the lug 33, tows a carrier having thereon a presser block for bending the material around a stationary form. At a predetermined point in the rotation of the gear 2, the switch or kick-off lever 41 engages a stop 47, preferably adjustably secured to a fixed support, and is thereby vibrated so as to exert a pull through the arm 39 upon the bell-crank 24. The bell-crank and the rod 25 will be, consequently, rocked so that the link 23 and lever 21 will be returned to their initial positions shown in full lines in Fig. 1, this return movement of the link 23 and lever 21 obviously pulling the link 26 and lever 27 to their initial positions. The pin 36, by engaging against the link 26, arrests the movement of the parts when the clutch member has been released from the driving gear. The link 22 moves simultaneously with the lever 21 so force is applied equally to the two ends of the rod 18 to move the clutch member to or from the gear. It will be readily noted that there is, in effect, a toggle at each side of the clutch, straightening the toggles engaging the clutch in the gear and breaking the toggles releasing the clutch.

The beveled surfaces 34, 35 on the lug 33 accommodate the relative angular movement of the draw-bar jaws 49 and 50 in the operation of the machine.

It is to be understood that various changes may be made in the minor details of the mechanism without departing from the invention as the same is defined in the following claims.

Having thus described our invention, what we claim as new and desire to secure by Letters Patent of the United States, is as follows:

1. An apparatus of the class described comprising two connected members mounted for pivotal movement, a clutch slidably mounted between said members, a gear rotatable between said members, the clutch having toothed portions adapted to engage between the teeth of said gear, means to shift and hold the clutch in engagement with the gear whereby the pivoted members will move with the gear, and means to automatically disengage said shifting and holding means.

2. An apparatus of the class described comprising two parallel connected members pivoted to a fixed support, a gear rotatable about the fixed support between the said members, a clutch mounted slidably between and engaging said members in the plane of the gear and adapted to peripherally engage the same whereby the members will move with the gear, and means carried by the pivoted members to shift said clutch in and out of engagement with the gear.

3. A gear clutch device comprising a toothed gear, a clutch member slidably mounted in the plane of the gear and provided with projections adapted to engage between the teeth of the gear whereby the clutch member will move bodily with the gear about the center thereof, and means to move said clutch to and from said gear on a radius of the same.

4. The combination with a rotatable gear, of a clutch member slidable to and from the gear in the plane thereof to peripherally engage the same, whereby to move bodily with the gear about the center thereof, and toggle mechanism acting on the clutch member to move it into or out of engagement with the gear and hold it in either position.

5. The combination of a rotatable gear, a bar mounted for rotation about the center of the gear and projecting beyond the gear, a clutch member slidably fitted to said bar in position to peripherally engage the gear, a rock shaft carried by said bar, a lever having pivotal connection with the clutch, a link secured to the rock shaft and pivoted to said lever intermediate the ends thereof, an angular shifting lever, and a link connection between the shifting lever and the first-mentioned lever.

6. An apparatus of the class described comprising a rotatable gear, a bar mounted for rotation about the center of the gear and projecting beyond the gear, a clutch slidably fitted to said bar in position to peripherally engage the gear, a rock shaft supported by the bar, cranks at the ends of the rock shaft, a lever pivoted between its ends to one of said cranks and having one end pivoted to the clutch, a trip lever mounted upon the bar and having one end free, a link connecting the opposite end of said trip lever with a crank on the rock shaft, a shifting lever mounted upon the bar at the free end of the same, and a link connecting said shifting lever with the first-mentioned lever.

7. An apparatus of the class described comprising a rotatable gear, a bar mounted for rotation about the center of the gear and extending beyond the gear, a clutch slidably fitted to said bar in position to peripherally engage the gear, means carried by the bar for shifting the clutch, and a member secured upon the bar at the free end of the same and provided with a lug to be engaged by a member to be pulled by the bar.

In testimony whereof we affix our signatures.

PHILIP B. WALLACE. [L. S.]
FRANK H. FOX. [L. S.]